US007970357B2

(12) United States Patent
Gili et al.

(10) Patent No.: US 7,970,357 B2

(45) Date of Patent: Jun. 28, 2011

(54) TRANSPONDER WITH STABILIZED OSCILLATOR

(75) Inventors: Paul E Gili, Mason, NH (US); Karl D Brommer, Exeter, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 347 days.

(21) Appl. No.: 12/271,299

(22) Filed: Nov. 14, 2008

(65) Prior Publication Data

US 2009/0072950 A1 Mar. 19, 2009

Related U.S. Application Data

(63) Continuation-in-part of application No. 11/578,275, filed on Jul. 30, 2007.

(51) Int. Cl.
*H04B 1/44* (2006.01)

(52) U.S. Cl. .................... 455/83; 455/127.1; 455/343.1

(58) Field of Classification Search ................ 455/41.1, 455/41.2, 41.3, 73, 78, 82, 83, 127.1, 343.1; 340/10.1; 307/104, 154; 320/108

See application file for complete search history.

(56) References Cited

U.S. PATENT DOCUMENTS 3,782,730 A * 1/1974 Horchler ...................... 473/353
5,153,583 A * 10/1992 Murdoch .................. 340/10.34
5,273,939 A 12/1993 Becker et al.
5,305,008 A * 4/1994 Turner et al. .................... 342/44
6,087,743 A * 7/2000 Guckel et al. ........... 310/40 MM
6,211,786 B1 * 4/2001 Yang et al. ................. 340/572.5
6,259,372 B1 7/2001 Taranowski et al.
6,282,407 B1 * 8/2001 Vega et al. .................. 455/41.1
6,946,989 B2 9/2005 Vavik et al.
7,546,092 B1 * 6/2009 Murdoch ....................... 455/82
2003/0234730 A1 12/2003 Arms et al.
2004/0041714 A1 * 3/2004 Forster ..................... 340/870.17
2007/0085689 A1 4/2007 Brommer et al.
2007/0281657 A1 12/2007 Brommer et al.

FOREIGN PATENT DOCUMENTS

WO 2007025024 3/2007
WO 2007025025 3/2007
WO 2007025060 3/2007
WO 2007025061 3/2007

OTHER PUBLICATIONS

"Was That Really a Wildlife Tag?", an excerpt from Homing In, 73 Magazine, Jan. 2003. Printed from http://www.homingin.com/joemoell/squeff.html on Aug. 12, 2008.

(Continued)

*Primary Examiner* — Nguyen Vo

(74) *Attorney, Agent, or Firm* — Finch & Maloney PLLC; Neil F. Maloney

(57) ABSTRACT

A coherent RFID tag design having no internal power source is disclosed. The design exhibits a longer detection range and less interference relative to conventional tag designs. The coherent RFID tag design operates in a locked or stabilized fashion, in that the frequency at which energy is parasitically coupled to the RFID tag (via its antenna) is the same as the frequency at which the RFID tag transmits information utilizing the same antenna. The RFID tag design allows a greater number of RFID tags to be deployed, without causing cross-tag interference issues and the like.

21 Claims, 5 Drawing Sheets

OTHER PUBLICATIONS

Kurokawa, "Injection Locking of Microwave Solid-State Oscillators", Proceedings of the IEEE, vol. 16, No. 10, Oct. 1973 (28 pages).
Lindsey et al., "Mutual Synchronization Properties of a System of Two Oscillators with Sinusoidal Phase Detectors", IEEE Transactions on Communications, Dec. 1976 (6 pages).
Van Der Pol, "The Nonlinear Theory of Electric Oscillations", Proceedings of the Institute of Radio Engineers, vol. 11, No. 9, Sep. 1934 (26 pages).
Blaquere, "Nonlinear Oscillators and the Nyguist Diagram", J. Phys. Radium 13, 527-540 (1952) (15 pages) (English abstract provided).
Schlosser, "Noise is Mutually Synchronized Oscillators", IEEE Transations on Microwave Theory and Technigues, vol. MIT-16, No. 9, Sep. 1968 (6 pages).
Gersho et al., Mutual Synchronization of Geographically Separated Oscillators, Bell Syst. Tech. J., vol. 45, Dec. 1966 (17 pages).
International Search Report from related PCT Application PCT/US06/01890, Aug. 24, 2006 (1 page).

* cited by examiner

TRANSPONDER WITH STABILIZED OSCILLATOR

RELATED APPLICATIONS

This application is a continuation-in-part to U.S. application Ser. No. 11/578,275, filed Jul. 30, 2007, and titled "Microradio Design, Manufacturing Method, and Applications for Use of Microradios". In addition, this application is related to U.S. application Ser. No. 12/271,292, filed Nov. 14, 2008, and titled "Dispersive Antenna for RFID Tags". Each of these applications is herein incorporated by reference in its entirety.

FIELD OF THE INVENTION

The invention relates to transponders, and more particularly, to transponders designed to operate in a coherent manner.

BACKGROUND OF THE INVENTION

Radio-frequency identification (RFID) is an identification technique that involves the use of devices known as RFID tags. An RFID tag is a transponder that can be attached to or otherwise integrated into an item to be tracked. The item may be, for example, a product or pallet of products such as those stored in a distributor's warehouse, or individual products on the shelves of a retailer. The item may also be a person or animal, or simply any item exhibiting a particular state. In any such cases, the RFID tag can be used in conjunction with a tag reader to uniquely identify the item, or to specify a condition or state of the item using radio waves. In general, a tag reader emits an interrogation signal, which is received and responded to by the RFID tag, thereby resulting in identification of the tagged item. Other information may also be stored in the RFID tag, such as location, number of items remaining in stock, and condition or state of item (e.g., open or closed state).

There are two main classes of RFID tags: passive and active. A passive RFID tag derives its energy for operation from the RF field emitted by the tag reader, and responds to the reader by modulating the reflectivity of its antenna, thereby returning varying amounts of the incident RF energy. An active or semi-active RFID tag responds to the tag reader using RF energy derived from a battery or other local power source on the tag. An antenna included in the RFID tag radiates energy in the radio frequency spectrum to and from the RFID tag. A benefit of passive configurations over active configurations is that no internal power source is required, so as to allow for lower cost and a smaller tag form factor.

However, there are problems associated with passive configurations. For instance, batteryless RFID tags powered by scavenged RF power exhibit a relatively low power output and low sensitivity, and therefore are ineffective over longer ranges. As such, passive RFID tags are typically limited to applications having a short operation range (e.g., less than a few feet), such as those RFID tags used at point of sale for anti-shoplifting and inventory control.

What is needed, therefore, are RFID tag designs that exhibit greater range of operation without any battery or other such on-board power source.

SUMMARY OF THE INVENTION

One embodiment of the present invention provides a transponder. The transponder includes a rectifier, an oscillator configured for squegging to stop oscillations before the oscillator reaches steady state operation, a hysteretic switch coupled between the rectifier and the oscillator, and a radiative structure coupled both to the rectifier and the oscillator. In one such case, the oscillator has an output that is coherent with an external input signal. In another such case, the radiative structure is capacitively coupled to the oscillator. In another such case, the oscillator includes a nonlinear amplifying device and a resonant feedback path, and the oscillator reaches steady state when it limits its output power such that the loop gain around the resonant feedback path is unity. In another such case, the hysteretic switch is operative to switch a capacitor to the oscillator when voltage across the capacitor is above a first threshold voltage, and to maintain connection of the capacitor to the oscillator until charge on the capacitor drops below a second threshold voltage that is lower than the first threshold voltage. In one such configuration, once the first threshold voltage is reached on the capacitor, the hysteretic switch begins to conduct and there is a turn-on transient period which exists after power from the capacitor is applied, but before steady state of the oscillator is reached. In one particular such configuration, during the turn-on transient period, there is an exponentially increasing envelope of a sine wave output of the oscillator. In another particular such configuration, during the turn-on transient period, the oscillator acts as a negative resistance. In another particular such configuration, during the turn-on transient period, oscillations output by the oscillator increase in amplitude and are coherent with an external input signal. The transponder may be included, for example, in a system having a plurality of transponders, and the plurality of transponders emit coherent signals in phase with one another and act as elements of a spatial antenna array. In another case, the transponder includes a storage capacitor, wherein a time constant formed by the hysteretic switch, a supply current loading of the oscillator, and the storage capacitor prevent the oscillator from ever reaching its fully limited output voltage. In another case, the radiative structure is capacitively coupled to the oscillator by a capacitor, and the capacitor can be adjusted to fine tune the oscillator for desired squegging operation.

Another embodiment of the present invention provides a system that includes a plurality of transponders, wherein the plurality of transponders emit coherent signals in phase with one another and act as elements of a spatial antenna array. In this example embodiment, each transponder includes a rectifier, an oscillator configured for squegging to stop oscillations before the oscillator reaches steady state operation, wherein the oscillator has an output that is coherent with an external input signal. Each transponder further includes a hysteretic switch coupled between the rectifier and the oscillator, wherein the hysteretic switch is operative to switch a capacitor to the oscillator when voltage across the capacitor is above a first threshold voltage, and to maintain connection of the capacitor to the oscillator until charge on the capacitor drops below a second threshold voltage that is lower than the first threshold voltage. Each transponder further includes a radiative structure coupled both to the rectifier and the oscillator. In one such case, the oscillator includes a nonlinear amplifying device and a resonant feedback path, and the oscillator reaches steady state when it limits its output power such that the loop gain around the resonant feedback path is unity. In another such case, once the first threshold voltage is reached on the capacitor, the hysteretic switch begins to conduct and there is a turn-on transient period which exists after power from the capacitor is applied, but before steady state of the oscillator is reached, and during the turn-on transient period, oscillations output by the oscillator increase in amplitude and are coherent with an external input signal. In one particular such configuration, during the turn-on transient period, the oscillator acts as a negative resistance and has an exponentially increasing envelope of a sine wave output. In another case, each transponder further includes a storage capacitor, and a time constant formed by the hysteretic switch, a supply current loading of the oscillator, and the storage capacitor prevent the oscillator from ever reaching its fully limited output voltage. In another case, the radiative structure is capacitively coupled to the oscillator by a capacitor, and the capacitor can be adjusted to fine tune the oscillator for desired squegging operation.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

Figure 1:
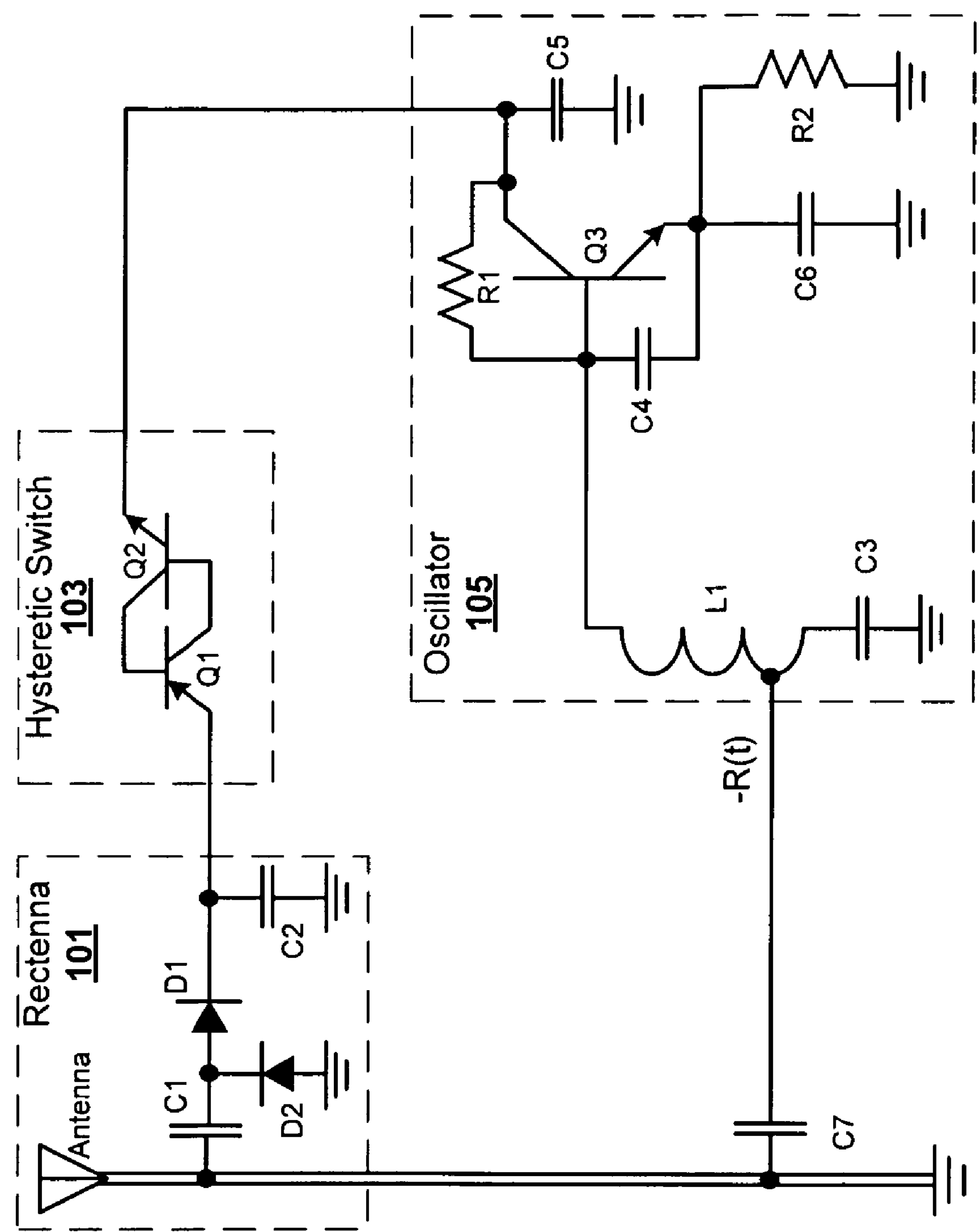
FIG. 1 is a schematic of a coherent RFID tag circuit configured in accordance with an embodiment of the present invention.

A coherent RFID tag design having no internal power source is disclosed. The design exhibits a longer detection range and less interference relative to conventional tag designs. The coherent RFID tag design operates in a locked or stabilized fashion, in that the frequency at which energy is parasitically coupled to the RFID tag (via its antenna) is the same as the frequency at which the RFID tag transmits information utilizing the same antenna. The RFID tag design allows a greater number of RFID tags to be deployed, without causing cross-tag interference issues and the like.

General Overview

In general, the RFID tag design includes a rectifying antenna (rectenna) and a stabilized oscillator circuit that operates in conjunction with a hysteretic circuit. The tag is batteryless and includes no internal power source. Rather, it scavenges RF power received from the tag reader interrogation signal. The oscillator circuit is stabilized in that it is configured to lock on to the frequency of the interrogator signal provided by the tag reader. As such, the interrogator signal (from the tag reader) and the response signal (from the tag oscillator) have the same frequency and are in phase both temporally and spatially. Thus, the RFID tag design provides an output which is coherent with a known controlled input signal (interrogator signal), thereby greatly improving frequency stability of the tag oscillator and making the tag easier to detect than a tag having a non-coherent or otherwise unstabilized oscillator.

For a given application, a plurality of these coherent RFID tags can be deployed (ranging from two RFID tags to many thousands of RFID tags in massive deployment applications). In any such cases, the stabilized oscillator circuits of the tags collectively coherently with one another in time and space to increase the overall radiated power. In particular, if N tags are deployed, the available power adds as N-squared in the time domain rather than N, and can be made to form a beam with a gain approaching N-squared relative to isotropic. Note that in this example case, as contrasted to conventional beamforming with power dividers and array elements, there is no elemental power division before radiation.

A system that provides no means to stabilize the frequency of the oscillator will not support as great a range between the tag reader (sometimes referred to as an interrogator) and RFID tag, as compared to a coherent system as described herein. For a given signal level and required signal to noise ratio (SNR), the range improvement can be directly related to the ratio of frequency stabilization since this determines the noise bandwidth and hence SNR. An unstabilized, small oscillator at 1000 MHz for example will have a frequency stability of about 0.1% or 1 MHz at best, even using temperature compensation and highly stable materials for the frequency determining resonator. A coherent RFID tag as described herein, on the other hand, may have a stability of better than 100 Hz, thereby narrowing the noise bandwidth by a factor of 1 MHz/100 Hz=$10^4$ or 40 dB. With received power decreasing as the square of range, the range (between interrogator and tag) for the same SNR would increase by a factor of 100.

An RFID tag described herein has numerous applications and can be used, for example, as an electromagnetic identification device for inventory control, asset management, automobile, and animal or object tracking from a much larger distance than is possible without a stabilized oscillator design and ensuing coherence, as described herein.

RFID Tag

FIG. 1 is a schematic of a coherent RFID tag configured in accordance with an embodiment of the present invention. As can be seen, the coherent RFID tag circuit is configured with three main blocks, including a rectenna 101, a hysteretic switch 103, and a stabilized oscillator 105.

The rectenna 101 is configured with an antenna operatively coupled to a rectification circuit including capacitors C1 and C2 and diodes D1 and D2. The rectenna 101 provides DC power to the RFID tag circuitry by rectification and storage of RF energy collected by the antenna. The antenna can be configured as conventionally done, and will depend on the frequency band of interest. Similarly, the values of capacitors C1 and C2 will depend on the frequency band of interest and the amount of RF energy to be stored. Likewise, diodes D1 and D2 can be selected based on the frequency band of interest and the amount of RF energy to be stored. In one example embodiment, the antenna is implemented with a 2.4 GHz surface mount or monopole antenna (e.g., Antenova, Ltd., P.N. 3030A6250-01). Numerous such radiative structures can be used. Note that the double line feature connecting the antenna to ground as shown in FIG. 1 is functionally a pair of distributed inductances, wherein one of the distributed inductances is connected between the antenna and capacitor C7, and the other distributed inductance is connected from that point to ground. Diodes D1 and D2 can be implemented, for example, with hot carrier RF detector diodes (e.g., Avagotech, P.N. HSCH5340). Capacitor C1 can be implemented, for example, with a 100 pF antenna coupling capacitor, and capacitor C2 can be implemented, for example, with 1 uF energy storage capacitor.

The hysteretic switch 103 is configured to permit the RFID tag to absorb ambient radiation over a period of time until such time as the capacitor C2 is sufficiently charged (e.g., predetermined threshold), after which the power from the capacitor C2 is coupled to the oscillator 105 which then emits a signal burst. The charging cycle of C2 is generally longer relative to the transmit cycle of the oscillator 105 (i.e., C2 generally discharges faster than it charges). In the example embodiment shown, the hysteretic switch 103 is implemented with transistors Q1 and Q2 coupled as shown (e.g., Q1: PNP 2N5089 and Q2: NPN 2N5087, in surface mount package, if desired). Other such hysteretic switching schemes will be apparent in light of this disclosure. In any such cases, the hysteretic switch 103 is operative to switch capacitor C2 to oscillator 105 when the voltage across capacitor C2 is above a predetermined level, and to maintain the connection of capacitor C2 to oscillator 105 until such time as the charging on capacitor C2 drops below a predetermined level. In this way, hysteretic switch 103 allows conduction of electrical current when a first "charged" threshold voltage is reached (which triggers operation of oscillator 105), and continues to allow conduction of electrical current until a second lower "recharge" threshold voltage is reached, at which time conduction ceases (and oscillator 105 stops oscillating).

The stabilized oscillator 105 includes a nonlinear amplifying device, which in this example embodiment is implemented with a low power microwave bipolar transistor Q3 (e.g., NEC/CEL, P.N. NE68018). Alternatively, this nonlinear amplifying device may be implemented with a negative resistance diode or other such suitable device. In any such cases, the nonlinear amplifying device (such as Q3) reaches an equilibrium state when it limits its output power such that the loop gain around a resonant feedback path (comprising capacitors C4 and C6 operatively coupled to Q3 as shown) is unity. The frequency of oscillation can vary depending on the given application. In one example embodiment, the frequency of oscillation is in the range of about 800 MHz to 3 GHz. For instance, typical FCC-allowed unlicensed transmitting tag frequency bands are at 915 MHz and 2.45 GHz, although other frequencies can be used. L1 and C3 resonate and set the oscillation frequency, with C4 and C6 providing feedback for nonlinear amplifying device Q3.

In one particular such embodiment, each of capacitors C3, C4, C5, C6, and C7 are on the order of several picofarads (e.g., 3 pF to 5 pF), and inductor L1 is on the order of several nanohenries (e.g., 3 nH to 5 nH). Resistors R1 and R2 provide bias for Q3 (e.g., collector-emitter voltage Vce and collector current Ic). In this example embodiment, R1 is 200 Kohms, and R2 is 1 Kohms, so as to provide Q3 biasing conditions where Vce equals about 0.9v and Ic equals about 1.0 mA. L1, R1, R2 and C3-7 can be implemented, for example, with common surface mount chip devices in a standard 0603 package (0.06"×0.03") or other suitable packaging. Alternatively, L1 can be a printed wiring board or substrate trace, and R1, R2 and C3-6 can be implemented with thin and/or thick film technology. Likewise, L1 can be implemented with thin and/or thick film technology. Components L1, R1, R2 and C3-7 can be adjusted or otherwise fine tuned if so necessary, using techniques such as laser trim, wire bond jumpers, etc. The components shown in FIG. 1 can be implemented with any components suitable for a given application, and the present invention is not intended to be limited to any particular configuration or set of components.

Turn-on Transient Period

Figure 2:
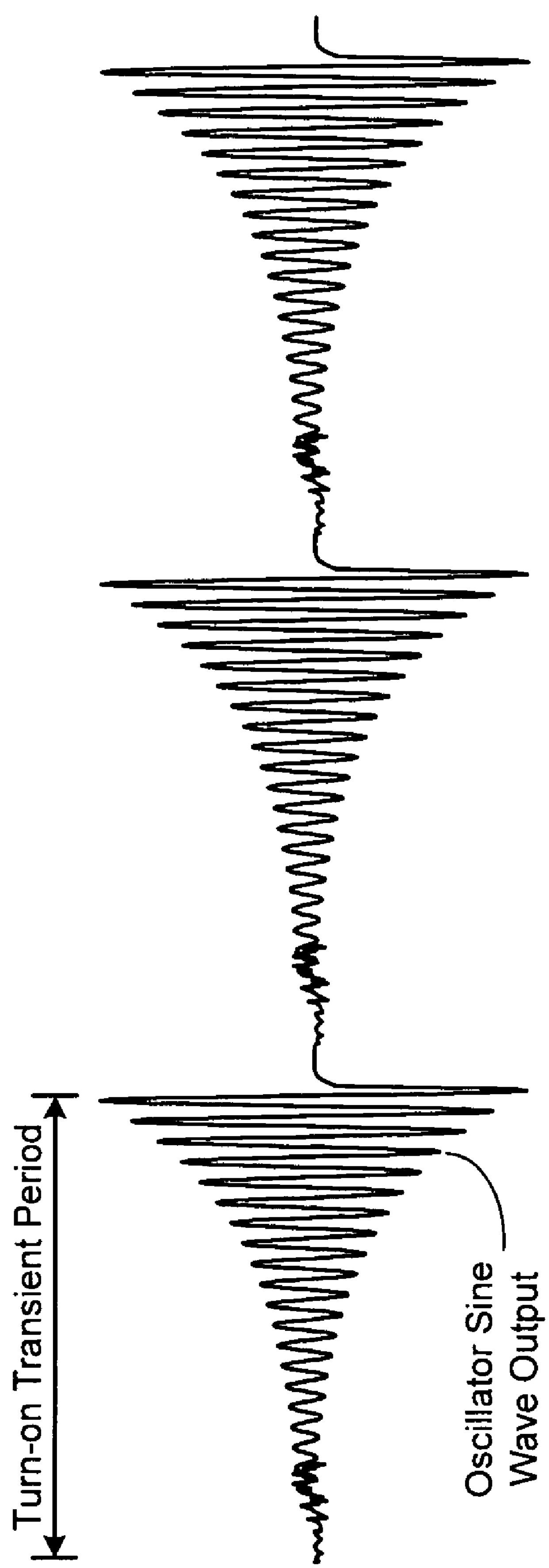
FIG. 2 illustrates a waveform of an input interrogator signal and noise current into the base of an oscillating transistor of the coherent RFID tag circuit shown in FIG. 1, in accordance with an embodiment of the present invention.

Once the "charged" threshold voltage is reached on capacitor C2, the hysteretic switch 103 begins to conduct and there is a short turn-on transient period (as best shown in FIG. 2) which exists after DC power from capacitor C2 is applied to the active device Q3 by the hysteretic switch 103, but before this equilibrium is reached. As can be seen in FIG. 2, during this turn-on transient period, there is an exponentially increasing envelope of the sine wave output of stabilized oscillator 105. During this turn-on period, the oscillator 105 acts as a very sensitive amplifying negative resistance, designated as −R(t) in FIG. 1, with large gain. Before amplitude limiting occurs, the transient solution to the oscillator 105 circuit transfer function has poles in the right-hand half of the s-plane causing the increasing envelope of the sine wave shown in the time domain waveform of FIG. 2. The sine wave is at the natural resonant frequency of the oscillator 105 (e.g., 915 MHz or 2.45 GHz).

Figure 3:
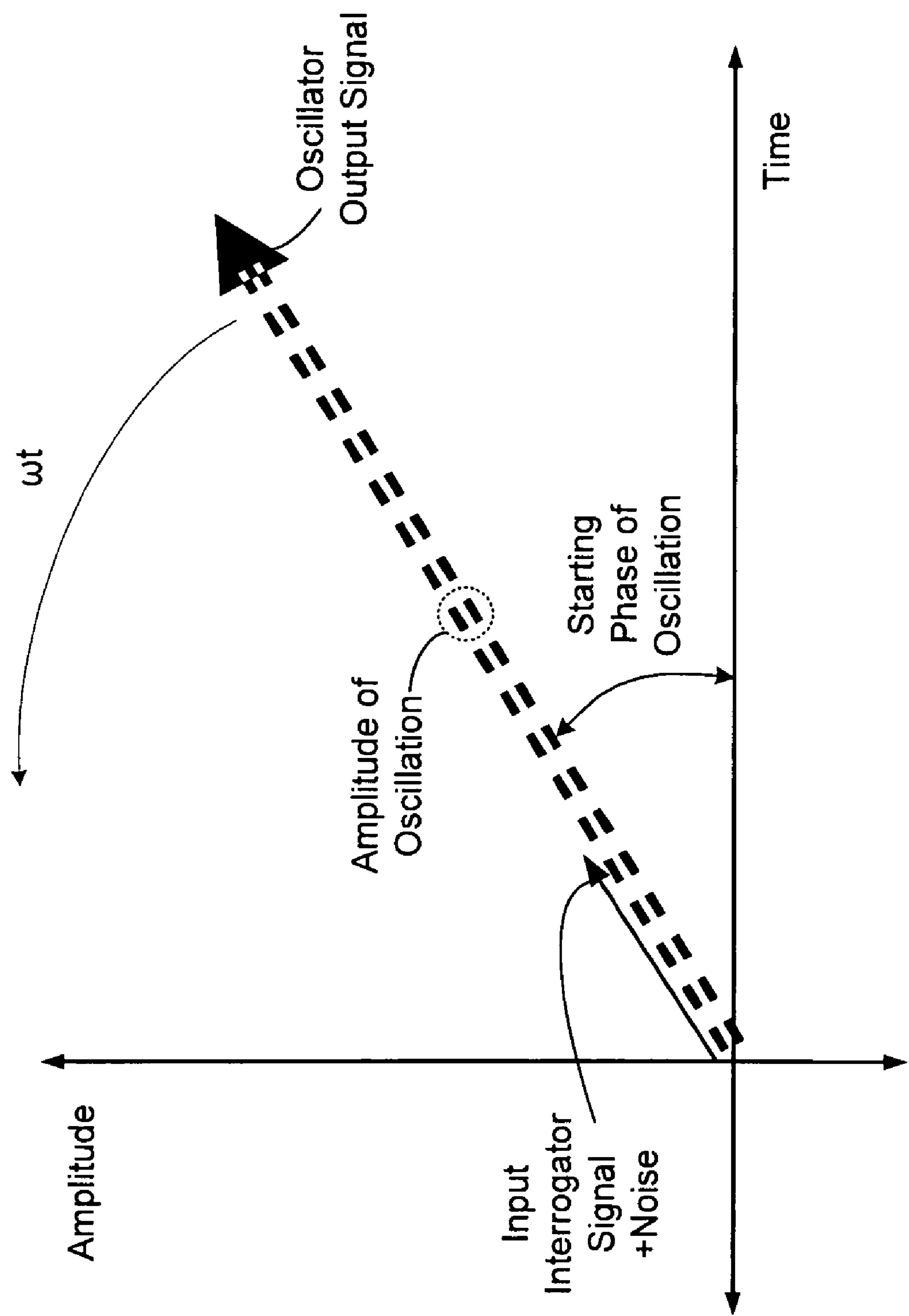
FIG. 3 illustrates a phasor representation of the oscillator signal and input interrogator signal during the turn-on transient period, showing coherence during the turn-on transient period and significant amplification of the input interrogator signal, in accordance with an embodiment of the present invention.

Without any external signals (i.e., no interrogator signals) supplied to the input of the nonlinear amplifier Q3, oscillations will start on thermal noise and have a random starting phase, as best shown in FIG. 3. If, however, an external signal is supplied (such as an interrogator signal from an RFID tag reader) to the stabilized oscillator 105 near its natural frequency, oscillations will start in phase with the external signal. Note that this phase is the phase of the external signal plus noise, which is a different situation from that encountered in an FM detector where a capture effect prevents the signal from being correctly detected in low SNR cases. One result of adding the relatively small noise (thermal noise, etc) signal at the input of active device Q3 is that the envelope of the oscillations reach a peak sooner than if the small noise signal was not there. This is the basis of a super-regenerative detector.

As shown in FIGS. 2 and 3, during the turn-on transient period, the oscillations increase in amplitude and are coherent with the interrogator input signal. This is due to the substantial negative resistance −R(t) of the oscillator 105 circuit, which results in the transient response with the increasing exponential envelope as shown in FIG. 2. The solution to the differential equation relating voltage and current to time and its derivatives has this form: exp(t/tau)*sin(w*t) during the turn-on transient period with t/tau>0. If oscillation has not started, the analysis further shows that any noise or signal existing in the oscillator 105 circuit will trigger the increasing exponential behavior. The level of signal will be on the order of the thermal noise, or in the example case of a 10 KHz bandwidth, about −134 dBm. With an interrogator input signal plus noise, the oscillator 105 will oscillate at its own natural frequency but appear to be coherent with the interrogator input signal for as long as the phase difference between the two signals does not exceed some amount, taken as 90 degrees. In particular, the output of the oscillator 105 will have a coherent component proportional to the cosine of the phase difference between the two signals. This amount results in approximately 3 dB difference in power from a truly coherent signal.

The input interrogation signal can be, for example, from an associated polling emitter, programmed to be near the natural frequency of the oscillator 105. In one such example embodiment, the sensitivity of the transponder is on the order of about −134 dBm. This is the value associated with thermal noise in a bandwidth of 10 KHz. The 10 KHz is the reciprocal of the average turn-on transient period, and is a function of the circuit squegging parameters, and the Q-factor of the tank circuit (L1 and C3) in oscillator 105. As is generally known, squegging is the ability of a circuit to produce an output that oscillates between a certain maximum and zero. Squegging may be seen, for instance, at the L1 side of capacitor C7.

The input interrogation signal could also be from a nearby RFID tag oscillator. In that case, the two RFID tags would emit coherent signals in phase and act as elements of a spatial antenna array. This would cause the signals to not only add in time to increase their power by $N^2$, but also to add in phase to generate a directive beam. If there are many such transponders emitting coherent signals which have been received at the same plane in space at a phase front of the incident wave (assumed to be in the far radiation field from the transmitter), they will then radiate coherently in space generate large amounts of power in the direction from which the incident wave came.

Squegging Oscillator

FIG. 2 illustrates a waveform of an input interrogator signal and noise current into the base of an oscillating transistor (Q3) of the coherent RFID tag circuit shown in FIG. 1, in accordance with an embodiment of the present invention. The oscillator 105 output is coherent with the input interrogator signal. As explained herein, squegging is built into the oscillator 105 circuit to automatically stop oscillations before the oscillator reaches a steady state (also referred to as an equilibrium state). The x-axis shown is time, and one cycle of the sinusoidal wave inside the increasing exponential is approximately 1 nanosecond, corresponding to about 1 GHz. The y-axis is the current into the base of the nonlinear amplifier Q3, which in this example embodiment is about 1 mA full scale for a low power tag. As can be seen in FIG. 3, the oscillations start out in phase with a very small input signal (interrogator+noise) and thus are coherent with that input signal. Even if the natural frequency (ωt) of the oscillator 105 is different from the exact signal of the input signal, it will appear to be the same for a short time interval (e.g., turn-on transient period or less), after which the supply voltage to the nonlinear amplifier Q3 is removed by operation of the hysteretic switch 103, the oscillation stops, and then the cycle starts over again.

As previously explained, bias and charge storage conditions of capacitor C2 are designed such that the hysteretic switch 103 opens to deactivate the nonlinear amplifying device (e.g., Q3 or other suitable device) before the oscillator 105 can ever maintain its own self-resonant frequency. In this sense, there is a relationship between components, such that the time constant of the relaxation oscillator 105 formed by the hysteretic switch 103, the supply current loading of the oscillator 105, and the storage capacitor C2 prevent the oscillator from ever reaching its fully limited output voltage, and that most of the time it is in the linear, exponentially increasing zone as shown in FIG. 2. Thus, coherence between the input interrogation signal and the high frequency oscillator output signal is maintained.

In operation, one or more of the RFID tags can be deployed as follows. Given a RFID tag, the free-running oscillator frequency (F1) can be determined, for example, by supplying constant voltage to the input of the oscillator 105. The input interrogator signal supplied to the antenna can then be set to frequency F1. With the interrogator signal applied, capacitor C7 can be adjusted to fine tune F1 for desired squegging operation. Thus, the oscillator 105 can be tuned to a particular frequency and generates an induction field at that frequency. The squegging but stable output comprises bursts of oscillation at that frequency interspersed by periods of non-oscillation. The duty cycle (i.e., the ratio between periods of non-oscillation and the periods of oscillation) can be set as desired by adjusting C7.

Coherence in an Ensemble of RFID Tags

Figure 4:
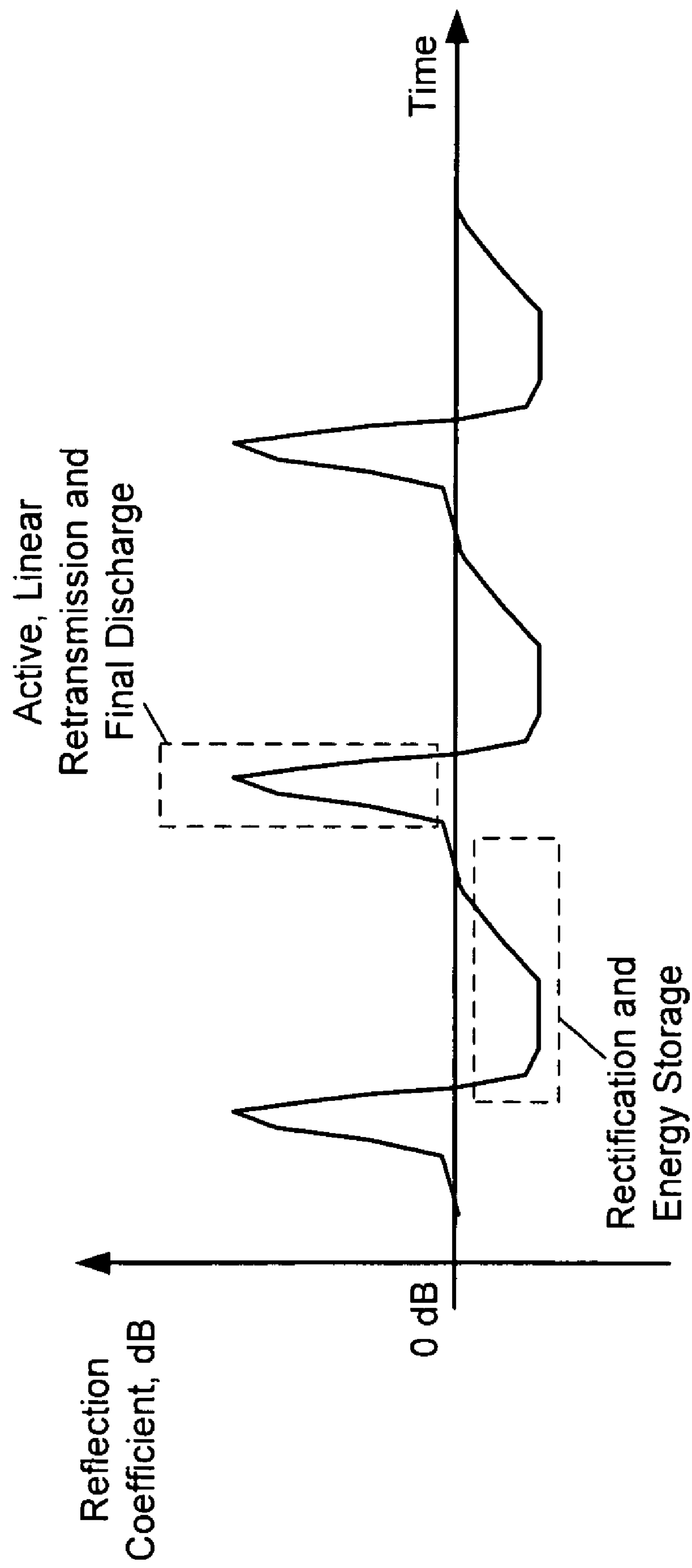
FIG. 4 demonstrates cyclic behavior of a coherent RFID tag circuit configured in accordance with an embodiment of the present invention.

When considering the effect of a plurality of RFID tags (also referred to herein as an ensemble of tags or a particle cloud), it is helpful to determine local effects of one tag which influences the overall performance. In more detail, recall that each RFID tag included in an ensemble cycles through stages of rectification, energy storage, active linear retransmission, and final discharge (as previously described). It is generally only during the active linear retransmission epoch (while oscillation is building up before saturation of the active oscillator device) that the reflection coefficient magnitude is greater than 1 (i.e., the impedance has a negative real part), as best shown in FIG. 4, which demonstrates cyclic behavior of each active RFID tag in discontinuous periods of active linear retransmission with a low duty cycle. This characteristic has the effect of a time-dependent negative resistance.

Note that during this time interval, the RFID tag is not phase-locked to any incoming signal; rather, it is a true negative resistance having a reflection coefficient greater than unity. Further note that there is no injection-locking involved in this process; that type of locking is an entirely different phenomenon dependant on the nonlinearity of the active device, input power, and circuit Q. In accordance with an embodiment of the present invention, the negative resistance during the active part of the cycle allows the RFID tag to respond to very low level interrogation signals. These signals are at a level on the order of kTBF, where kT is the noise power per Hz bandwidth of thermal noise in the oscillator circuit at temperature T, B is the circuit bandwidth (approximately f/Q), and F is a noise figure associated with the active device of the oscillator (e.g., around 5 dB or so). With typical values as described herein, the RFID tag sensitivity can approach −100 dBm which is a very low signal level. During the short negative resistance interval, the tag behaves linearly. The output power of a single coherent RFID tag can approach, for example, −10 dBm or better so that significant gains approaching many tens of dB can be achieved for a single tag. In an ensemble, the phase of each tag's reflection coefficient will be random compared to a common reference, because it depends on the phase of the natural frequency of oscillation which is very slightly different for each tag, and other random effects such as exact turn on time and delays through the individual oscillator circuits.

Figure 5:
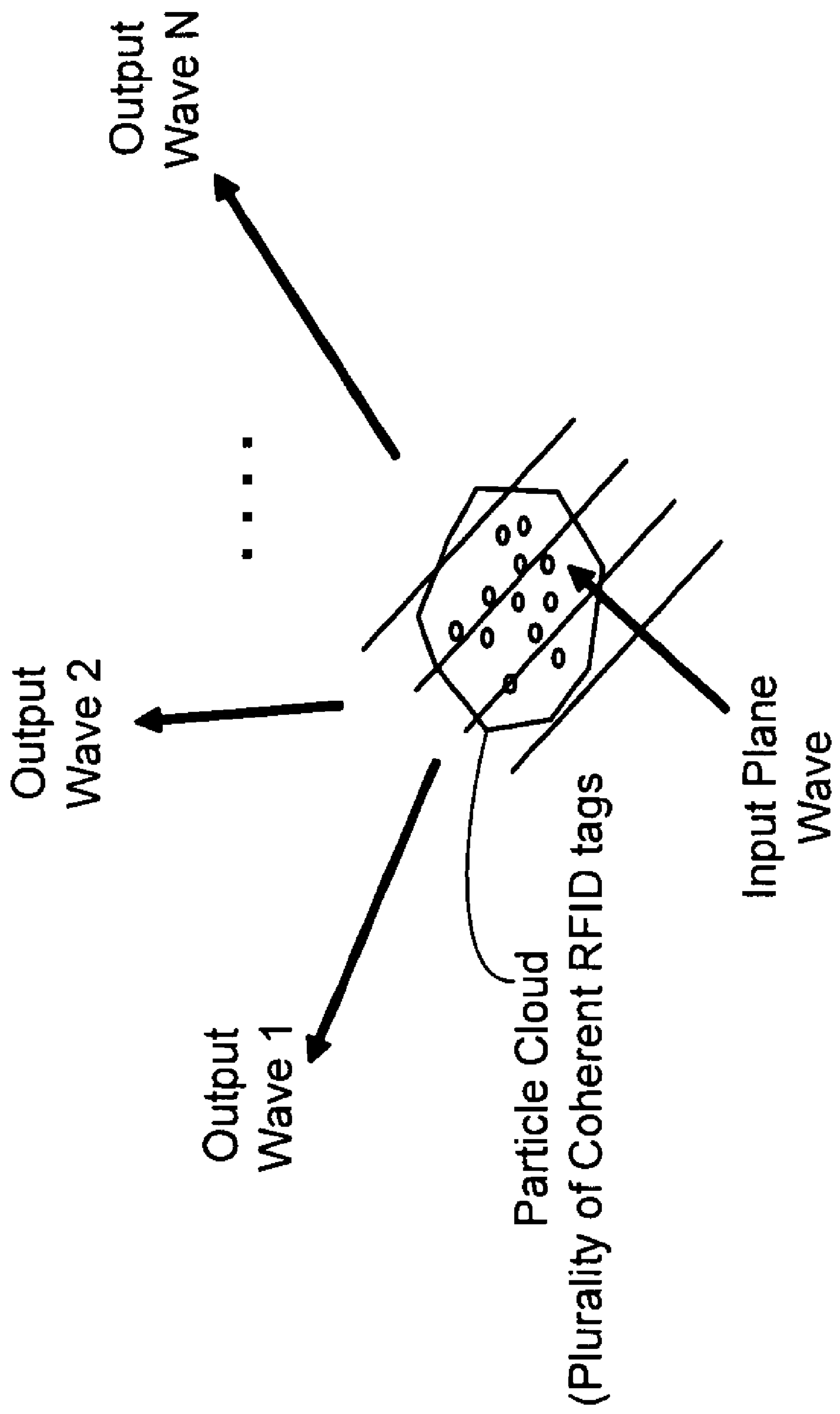
FIG. 5 illustrates the effect of a plurality of coherent RFID tags on a plane wave, in accordance with an embodiment of the present invention.

The fact that each RFID tag can be considered as a linear, periodically active repeater allows for relatively easy evaluation of the performance of a large number of such tag elements in space (e.g., where an ensemble of RFID tags is painted onto a surface or otherwise deployed). The time dependency and low duty cycle of the tags have the effect of increasing the effective spacing between tags randomly spaced, because only a fraction of them are on at any one time. A cloud or ensemble of such RFID tags will behave as an amplifier of an incident wave having a random starting phase. If the spacing of the tags (or particles) is small compared to a wavelength, the ensemble/cloud (e.g., plurality of RFID tags painted on to a surface or embedded in a material that is transparent to the transmission frequency) will generate new waves in random directions, but higher in output power by the number of active tags times the gain of each tag. In some embodiments, this number can be much greater than unity, since the duty cycle is on the order of 0.1%, or −40 dB and the gain can be, for example, +60 dB to +100 dB. This power is essentially isotropically radiated because of the random phase. This is best shown in FIG. 5, which illustrates an input plane wave (having an amplitude) striking a particle cloud of RFID tags, thereby generating N output waves (each having a higher amplitude) and scattered in random directions. In short, the RFID tag output signals combine coherently at any point in space. This spatial coherence is evidenced by the N-fold increase in power and concentration of that power at the same frequency and within the same bandwidth over which each RFID tag is interrogated. These coherent output signals are therefore much more detectable.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A transponder, comprising:
- a rectifier;
- an oscillator configured for squegging to stop oscillations before the oscillator reaches steady state operation;
- a hysteretic switch coupled between the rectifier and the oscillator, wherein the hysteretic switch is operative to selectively switch scavenged power to the oscillator, and a turn-on transient period exists after power is applied to the oscillator; and
- a radiative structure coupled both to the rectifier and the oscillator.

2. The transponder of claim 1 wherein the radiative structure is capacitively coupled to the oscillator.

3. The transponder of claim 1 wherein the oscillator includes a nonlinear amplifying device and a resonant feedback path.

4. The transponder of claim 1 wherein the hysteretic switch is operative to switch a capacitor to the oscillator when voltage across the capacitor is above a first threshold voltage, and to maintain connection of the capacitor to the oscillator until charge on the capacitor drops below a second threshold voltage that is lower than the first threshold voltage.

5. The transponder of claim 4 wherein once the first threshold voltage is reached on the capacitor, the hysteretic switch begins to conduct and the turn-on transient period exists after power from the capacitor is applied, but before steady state of the oscillator is reached.

6. The transponder of claim 5 wherein during the turn-on transient period, there is an exponentially increasing envelope of a sine wave output of the oscillator.

7. The transponder of claim 1 wherein during the turn-on transient period, the oscillator acts as a negative resistance.

8. The transponder of claim 1 wherein during the turn-on transient period, oscillations output by the oscillator increase in amplitude and are coherent with an external input signal.

9. The transponder of claim 1 wherein the transponder is included in a system having a plurality of transponders, and the plurality of transponders emit coherent signals in phase with one another and act as elements of a spatial antenna array.

10. The transponder of claim 1 wherein the oscillator has an output that is coherent with an external input signal.

11. The transponder of claim 1 further comprising a storage capacitor, wherein a time constant formed by the hysteretic switch, a supply current loading of the oscillator, and the storage capacitor prevent the oscillator from ever reaching its fully limited output voltage.

12. The transponder of claim 1 wherein the radiative structure is capacitively coupled to the oscillator by a capacitor, and the capacitor can be adjusted to fine tune the oscillator for desired squegging operation.

13. A transponder, comprising:
- a rectifier;
- an oscillator configured for squegging to stop oscillations before the oscillator reaches its steady state operation;
- a hysteretic switch coupled between the rectifier and the oscillator, the hysteretic switch operative to switch a capacitor to the oscillator when voltage across the capacitor is above a first threshold voltage, and to maintain connection of the capacitor to the oscillator until charge on the capacitor drops below a second threshold voltage that is lower than the first threshold voltage, wherein once the first threshold voltage is reached on the capacitor, the hysteretic switch begins to conduct and there is a turn-on transient period which exists after power from the capacitor is applied, but before steady state of the oscillator is reached; and
- a radiative structure coupled both to the rectifier and the oscillator;
- wherein during the turn-on transient period, oscillations output by the oscillator increase in amplitude and are coherent with an external input signal.

14. The transponder of claim 13 wherein during the turn-on transient period, the oscillator acts as a negative resistance and has an exponentially increasing envelope of a sine wave output.

15. The transponder of claim 13 wherein the radiative structure is capacitively coupled to the oscillator by a capacitor, and the capacitor can be adjusted to fine tune the oscillator for desired squegging operation.

16. A system, comprising:
- a plurality of transponders, each transponder comprising:
  - a rectifier;
  - an oscillator configured for squegging to stop oscillations before the oscillator reaches steady state operation, wherein the oscillator has an output that is coherent with an external input signal;
  - a hysteretic switch coupled between the rectifier and the oscillator, wherein the hysteretic switch is operative to selectively switch a scavenged power to the oscillator, and a turn-on transient period exists after power is applied to the oscillator; and
  - a radiative structure coupled both to the rectifier and the oscillator;
- wherein the plurality of transponders emit coherent signals in phase with one another and act as elements of a spatial antenna array.

17. The system of claim 16 wherein the oscillator includes a nonlinear amplifying device and a resonant feedback path.

18. The system of claim 16 wherein the hysteretic switch is operative to switch a capacitor to the oscillator when voltage across the capacitor is above a first threshold voltage, and to maintain connection of the capacitor to the oscillator until charge on the capacitor drops below a second threshold voltage that is lower than the first threshold voltage, and once the first threshold voltage is reached on the capacitor, the hysteretic switch begins to conduct and the turn-on transient period exists after power from the capacitor is applied, but before steady state of the oscillator is reached, and during the turn-on transient period, oscillations output by the oscillator increase in amplitude and are coherent with an external input signal.

19. The system of claim 18 wherein during the turn-on transient period, the oscillator acts as a negative resistance and has an exponentially increasing envelope of a sine wave output.

20. The system of claim 16 wherein each transponder further comprises a storage capacitor, and a time constant formed by the hysteretic switch, a supply current loading of the oscillator, and the storage capacitor prevent the oscillator from ever reaching its fully limited output voltage.

21. The system of claim 16 wherein the radiative structure is capacitively coupled to the oscillator by a capacitor, and the capacitor can be adjusted to fine tune the oscillator for desired squegging operation.

* * * * *